United States Patent
Soejima et al.

(10) Patent No.: US 12,189,081 B2
(45) Date of Patent: Jan. 7, 2025

(54) ICING DETECTOR

(71) Applicant: SUBARU CORPORATION, Tokyo (JP)

(72) Inventors: Hideki Soejima, Tokyo (JP); Mitsuru Kono, Tokyo (JP); Shuugo Yasui, Tokyo (JP); Satoshi Okada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 62 days.

(21) Appl. No.: 17/686,202

(22) Filed: Mar. 3, 2022

(65) Prior Publication Data

US 2022/0299675 A1  Sep. 22, 2022

(30) Foreign Application Priority Data

Mar. 19, 2021  (JP) ................................. 2021-045694

(51) Int. Cl.
*G01V 8/16* (2006.01)
*B64D 15/20* (2006.01)

(52) U.S. Cl.
CPC ............... *G01V 8/16* (2013.01); *B64D 15/20* (2013.01)

(58) Field of Classification Search
CPC .......... G01V 8/16; B64D 15/20; G01B 11/06; G01N 21/17; G01N 21/47; G01K 1/14
See application file for complete search history.

(56) References Cited

U.S. PATENT DOCUMENTS

| | | | | |
|---|---|---|---|---|
| 4,775,118 A | * | 10/1988 | Daniels | B64D 15/20 340/580 |
| 4,797,660 A | * | 1/1989 | Rein, Jr. | G08B 19/02 244/134 F |
| 4,851,817 A | * | 7/1989 | Brossia | G08B 19/02 340/600 |
| 5,014,042 A | * | 5/1991 | Michoud | B64D 15/20 244/134 F |
| 5,206,806 A | * | 4/1993 | Gerardi | G01M 5/0016 244/134 F |
| 5,475,370 A | * | 12/1995 | Stern | B64D 15/20 356/369 |

(Continued)

FOREIGN PATENT DOCUMENTS

| | | |
|---|---|---|
| CN | 111216899 A | 6/2020 |
| JP | S 63-135810 A | 6/1988 |

(Continued)

OTHER PUBLICATIONS

Extended European Search Report issued Jul. 21, 2022 for European Patent Application No. 22160286.5-1004.

(Continued)

*Primary Examiner* — Mohamed K Amara
(74) *Attorney, Agent, or Firm* — MCGINN I.P. LAW GROUP, PLLC

(57) ABSTRACT

An icing detector includes an aircraft structure, an exposed member, an optical fiber sensor, and a measuring device. The exposed member is coupled to the aircraft structure and is exposed to an outside of the aircraft structure. The optical fiber sensor is coupled to the exposed member and is covered by one or both of the aircraft structure and the exposed member. The measuring device is configured to measure light received from the optical fiber sensor.

11 Claims, 6 Drawing Sheets

(56) References Cited

U.S. PATENT DOCUMENTS

| | | | | |
|---|---|---|---|---|
| 5,596,320 | A * | 1/1997 | Barnes | B64D 15/20 250/578.1 |
| 5,617,076 | A * | 4/1997 | Stern | B64F 5/20 356/369 |
| 5,694,497 | A * | 12/1997 | Sansone | G01M 11/086 385/12 |
| 5,748,091 | A * | 5/1998 | Kim | G08B 19/02 340/580 |
| 5,760,711 | A * | 6/1998 | Burns | B64D 15/20 340/583 |
| 5,841,538 | A * | 11/1998 | Schoeffler | G01J 4/00 356/369 |
| 6,052,056 | A * | 4/2000 | Burns | G08B 19/02 250/573 |
| 6,069,565 | A * | 5/2000 | Stern | B64D 15/20 356/369 |
| 6,091,335 | A * | 7/2000 | Breda | B64D 15/20 340/580 |
| 6,215,940 | B1 * | 4/2001 | Johnson | G02B 6/00 385/136 |
| 6,430,996 | B1 * | 8/2002 | Anderson | G01K 13/028 73/170.26 |
| 6,819,265 | B2 * | 11/2004 | Jamieson | G08B 19/02 340/962 |
| 7,312,713 | B2 * | 12/2007 | Alfano | B64D 15/20 250/341.1 |
| 7,370,525 | B1 * | 5/2008 | Zhao | B64D 15/20 73/170.21 |
| 7,800,743 | B1 * | 9/2010 | Huffman | H04B 10/85 356/73.1 |
| 7,969,566 | B2 * | 6/2011 | Smith | G01N 21/8422 356/239.8 |
| 8,325,338 | B1 * | 12/2012 | Pope | G01N 21/65 356/301 |
| 9,555,894 | B2 * | 1/2017 | Botura | B64D 15/22 |
| 9,769,431 | B2 * | 9/2017 | Shi | B64D 15/20 |
| 10,099,791 | B2 * | 10/2018 | Borigo | B64D 15/20 |
| 10,175,167 | B2 * | 1/2019 | Grinderslev | G01B 11/06 |
| 10,232,949 | B2 * | 3/2019 | English | B64D 15/22 |
| 10,895,525 | B2 * | 1/2021 | Swanson | G01S 7/4817 |
| 11,479,361 | B2 * | 10/2022 | Cueto-Gomez | B64D 47/02 |
| 2005/0031246 | A1 * | 2/2005 | Rowe | G01H 13/00 385/12 |
| 2005/0100414 | A1 * | 5/2005 | Salama | E21B 17/01 405/224.2 |
| 2005/0103927 | A1 | 5/2005 | Barre et al. | |
| 2007/0046478 | A1 * | 3/2007 | Crisman | G08B 19/02 340/580 |
| 2007/0216536 | A1 * | 9/2007 | Alfano | B64D 15/20 340/583 |
| 2008/0110254 | A1 * | 5/2008 | Zhao | B64D 15/20 73/170.21 |
| 2013/0327756 | A1 * | 12/2013 | Clemen, Jr. | B64D 15/12 219/202 |
| 2014/0175271 | A1 * | 6/2014 | Samson | E21B 49/08 250/216 |
| 2015/0103867 | A1 | 4/2015 | Meis et al. | |
| 2017/0021934 | A1 | 1/2017 | Levkovitch et al. | |
| 2017/0030848 | A1 * | 2/2017 | Borigo | B64D 15/20 |
| 2017/0153387 | A1 * | 6/2017 | Wei | G01B 11/2441 |
| 2018/0284017 | A1 * | 10/2018 | Grinderslev | G01F 23/292 |
| 2019/0113561 | A1 * | 4/2019 | Yogeeswaran | H04B 10/071 |
| 2020/0207478 | A1 * | 7/2020 | Marom | B64D 15/20 |
| 2022/0057519 | A1 * | 2/2022 | Goldstein | G01S 17/88 |
| 2023/0408242 | A1 * | 12/2023 | Roman | G01B 7/10 |

FOREIGN PATENT DOCUMENTS

| | | |
|---|---|---|
| JP | 2005-145453 A | 6/2005 |
| JP | 2019-059473 A | 4/2019 |
| JP | 2019-070623 A | 5/2019 |
| JP | 2020-169864 A | 10/2020 |

OTHER PUBLICATIONS

Japanese Office Action, dated Sep. 3, 2024 in Japanese Application No. 2021-045694 and English Translation thereof.

* cited by examiner

ICING DETECTOR

CROSS-REFERENCE TO RELATED APPLICATIONS

The present application claims priority from Japanese Patent Application No. 2021-045694 filed on Mar. 19, 2021, the entire contents of which are hereby incorporated by reference.

BACKGROUND

The disclosure relates to an icing detector.

An icing sensor configured to detect icing that may occur on the surface of an aircraft is disclosed by Japanese Unexamined Patent Application Publication (JP-A) No. 2005-145453. The icing sensor disclosed by JP-A No. 2005-145453 detects icing with reference to the frequency of resonance that is caused in a finger by electrical excitation.

SUMMARY

An aspect of the disclosure provides an icing detector including an aircraft structure, an exposed member, an optical fiber sensor, and a measuring device. The exposed member is coupled to the aircraft structure and is exposed to an outside of the aircraft structure. The optical fiber sensor is coupled to the exposed member and is covered by one or both of the aircraft structure and the exposed member. The measuring device is configured to measure light received from the optical fiber sensor.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

An electrical icing sensor such as the one disclosed by JP-A No. 2005-145453 has a problem in being susceptible to electromagnetic interference.

It is desirable to provide an icing detector that is less susceptible to electromagnetic interference.

Embodiments of the disclosure will now be described in detail with reference to the accompanying drawings. The dimensions, materials, values, and other details to be described in the following embodiments are only exemplary for easy understanding of the disclosure and do not limit the disclosure, unless otherwise stated. In this specification and the accompanying drawings, elements having substantially the same functions or configurations are denoted by the same reference signs, respectively, and redundant description is thus omitted. The drawings are schematic and are not intended to be drawn to scale. Elements that are irrelevant to the disclosure are not illustrated.

First Embodiment

1. Overall Configuration of Aircraft

Figure 1:
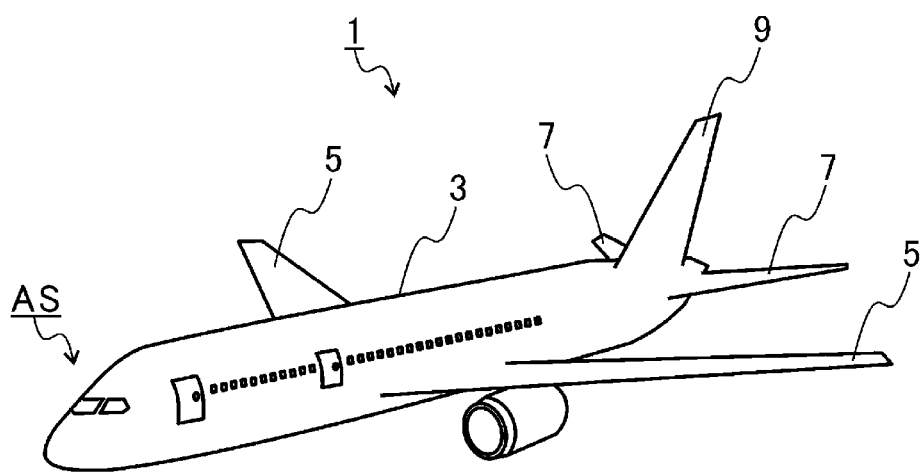
FIG. 1 is a perspective view of an aircraft according to an embodiment of the disclosure.

First, an overall configuration of an aircraft 1 according to a first embodiment of the disclosure will be described with reference to FIG. 1. FIG. 1 is a perspective view of the aircraft 1 according to the first embodiment of the disclosure.

As illustrated in FIG. 1, the aircraft 1 includes a fuselage 3, a pair of main wings 5, a pair of horizontal stabilizers 7, and a vertical stabilizer 9.

The fuselage 3 is a main structural member of the aircraft 1 and is longer in the front-to-rear direction (the roll-axis direction) than in the side-to-side direction (the pitch-axis direction) and in the top-to-bottom direction (the yaw-axis direction). The fuselage 3 has thereinside a passenger space, a drive source such as an engine, a fuel tank, a flight controller, measurement devices, and other relevant devices.

The pair of main wings 5 extend in the side-to-side direction from the right and left sides, respectively, of a central portion of the fuselage 3. The main wings 5 generate upward lift that acts on the aircraft 1.

The pair of horizontal stabilizers 7 extend in the side-to-side direction from the right and left sides, respectively, of a rear portion of the fuselage 3. The horizontal stabilizers 7 stabilize the aircraft 1 with reference to the pitch axis.

The vertical stabilizer 9 extends upward from the upper side of the rear portion of the fuselage 3. The vertical stabilizer 9 stabilizes the aircraft 1 with reference to the yaw axis.

While the aircraft 1 is flying in the air or when the aircraft 1 is stationed in a cold area, ice may be formed on the aircraft 1. For example, ice may be formed on the nose (hereinafter referred to as "aircraft structure AS") of the fuselage 3. If ice is formed on the aircraft 1, the weight of the aircraft 1 increases, which reduces the amount by which the aircraft 1 is raised by the same lift.

In this respect, the aircraft 1 according to the first embodiment includes an icing detector 100, which detects icing that may occur on the surface of the aircraft structure AS. While the first embodiment relates to a case where the aircraft structure AS is the nose of the fuselage 3, the aircraft structure AS is not limited thereto. For example, the aircraft structure AS may be any of the main wings 5, the horizontal stabilizers 7, the vertical stabilizer 9, and other relevant elements.

2. Configuration of Icing Detector

Figure 2:
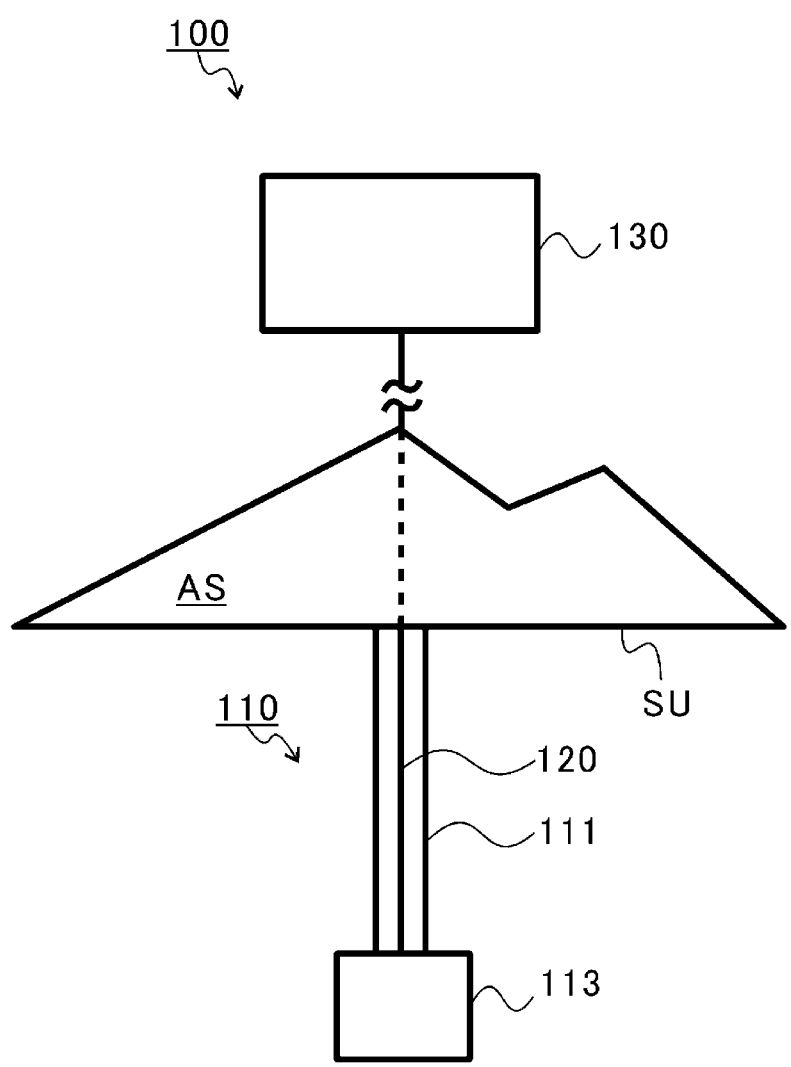
FIG. 2 schematically illustrates an icing detector according to the embodiment.

FIG. 2 schematically illustrates the icing detector 100 according to the first embodiment. As illustrated in FIG. 2, the icing detector 100 includes the aircraft structure AS, an exposed member 110, an optical fiber sensor 120, and a measuring device 130.

The exposed member 110 is fixed to an outer surface SU of the aircraft structure AS. Accordingly, the exposed member 110 is exposed to the outside of the aircraft structure AS. The exposed member 110 includes a post 111 and a weight member 113.

The post 111 stands on the outer surface SU of the aircraft structure AS and covers at least a portion of the optical fiber sensor 120. One end of the post 111 is fixed to the outer surface SU, while the other end of the post 111 is coupled to the weight member 113. The weight member 113 is a weight adjuster with which the weight of the exposed member 110 is adjustable.

The optical fiber sensor 120 is embedded in the post 111 and extends through the center of the post 111. That is, the optical fiber sensor 120 extends in the longitudinal direction of the post 111. The optical fiber sensor 120 covered by the exposed member 110 is permanently fixed to the exposed member 110. Thus, the optical fiber sensor 120 is coupled to the exposed member 110. The optical fiber sensor 120 further extends through the aircraft structure AS and is coupled to the measuring device 130.

The measuring device 130 is provided inside the aircraft structure AS. The measuring device 130 emits light into the optical fiber sensor 120 and measures light received from the optical fiber sensor 120. In the first embodiment, the measuring device 130 measures the backscatter of the light traveling through the optical fiber sensor 120.

If the optical fiber sensor 120 is strained or deformed, the frequency of the backscatter changes in the strained or deformed part. The measuring device 130 measures such a change in the frequency of the backscatter of the light traveling through the optical fiber sensor 120. The measuring device 130 is not limited to the one described above and may measure the change in the frequency of the reflection of the light traveling through the optical fiber sensor 120.

If the optical fiber sensor 120 is strained or deformed, the light loss in the optical fiber sensor 120 increases at the strained or deformed part, which reduces the backscatter occurring at the strained part. In this respect, the measuring device 130 may measure the amount of change in the quantity of backscatter of the light traveling through the optical fiber sensor 120.

The exposed member 110 permanently fixed to the optical fiber sensor 120 has a natural frequency f expressed as follows: $f=1/(2\pi) \times (k/m)^{1/2}$, where k denotes the spring constant of the exposed member 110, and m denotes the weight of the exposed member 110. That is, the natural frequency f of the exposed member 110 permanently fixed to the optical fiber sensor 120 is tunable by adjusting the spring constant k and the weight m of the exposed member 110.

Figure 3:
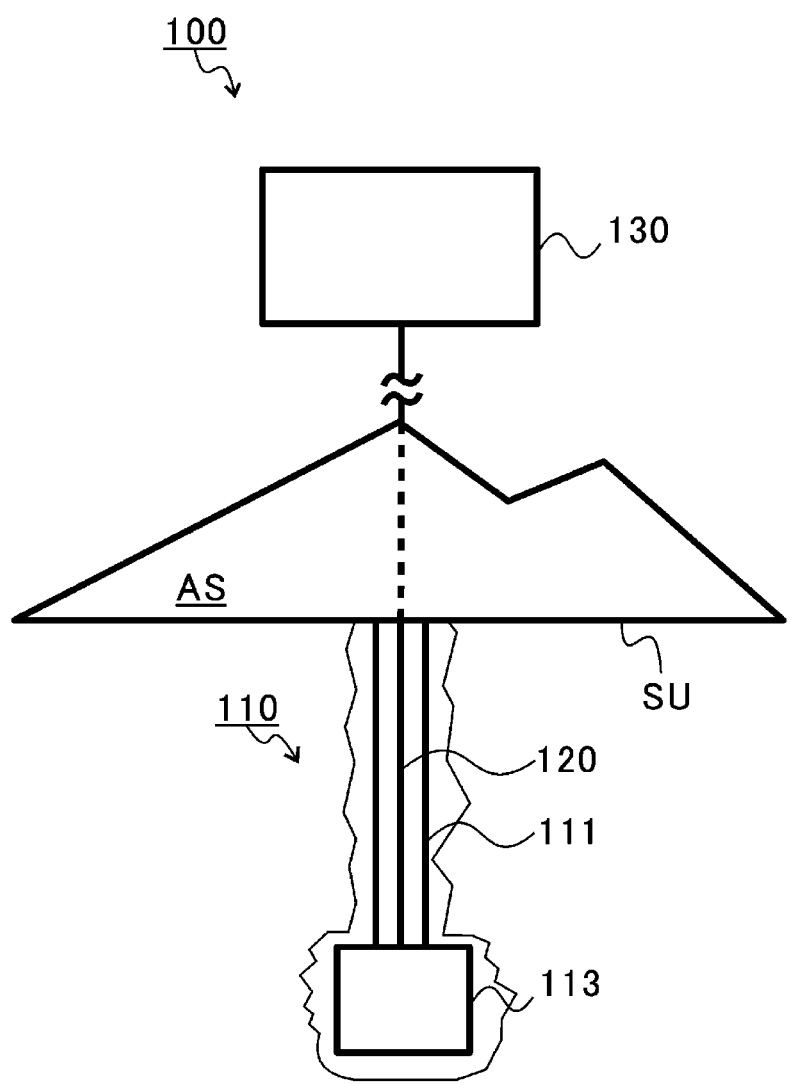
FIG. 3 schematically illustrates the icing detector according to the embodiment, with ice formed on an exposed member thereof.

FIG. 3 schematically illustrates the icing detector 100 according to the first embodiment, with ice formed on the exposed member 110. As illustrated in FIG. 3, if ice is formed on the exposed member 110, the weight and the rigidity of the exposed member 110 change. If the weight and the rigidity of the exposed member 110 change, the vibration frequency of the exposed member 110 changes.

If the vibration frequency of the exposed member 110 changes, the amount of strain or deformation in the optical fiber sensor 120 changes, which changes the frequency of the backscatter to be measured by the measuring device 130. The measuring device 130 measures such a change in the frequency of the backscatter, thereby detecting the occurrence of icing on the exposed member 110.

To summarize, with the icing detector 100 according to the first embodiment, since the optical fiber sensor 120 covered by the exposed member 110 is employed, the occurrence of icing on the exposed member 110 or on the aircraft 1 is detectable.

The optical fiber sensor 120 is less susceptible to electromagnetic interference. Therefore, the icing detector 100 according to the first embodiment is applicable to a location where electromagnetic interference may occur.

An electrical icing sensor such as the one disclosed by JP-A No. 2005-145453 employs a magnetic material, a crystal vibrator, or the like. Therefore, it is difficult for the electrical icing sensor such as the one disclosed by JP-A No. 2005-145453 to freely tune the resonance frequency thereof in accordance with the environment or structure to which the icing sensor is applied. In contrast, in the first embodiment, the natural frequency (resonance frequency) of the exposed member 110 permanently fixed to the optical fiber sensor 120 is freely tunable by changing, for example, the weight of the weight member 113.

In the first embodiment, the optical fiber sensor 120 is covered by the exposed member 110. Therefore, the durability of the optical fiber sensor 120 is less likely to be deteriorated than in a case where the optical fiber sensor 120 is exposed to the outside of the aircraft structure AS.

Figure 4:
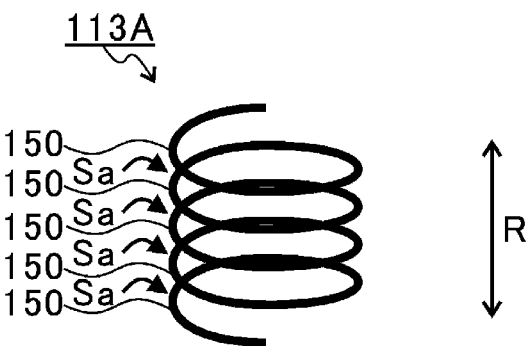
FIG. 4 illustrates a first modification of a weight member.

FIG. 4 illustrates a first modification of the weight member 113. As illustrated in FIG. 4, a weight member 113A according to the first modification has a spiral shape. The weight member 113A according to the first modification includes a plurality of portions: for example, turns 150, which are spaced apart from one another with gaps Sa in a center-axis direction R of the post 111. Thus, the weight member 113A according to the first modification has the gaps Sa provided between the plurality of portions thereof.

Figure 5:
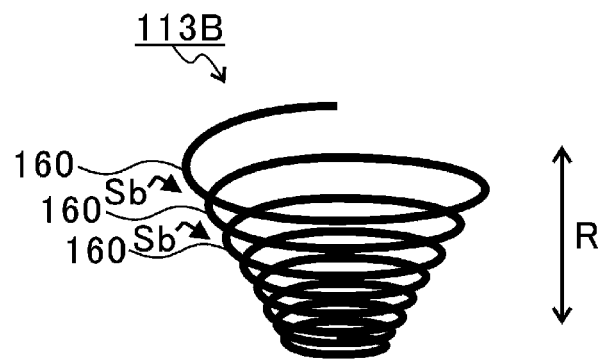
FIG. 5 illustrates a second modification of the weight member.

FIG. 5 illustrates a second modification of the weight member 113. As illustrated in FIG. 5, a weight member 113B according to the second modification has a conical spiral shape. The weight member 113B according to the second modification includes a plurality of portions: for example, turns 160, which are spaced apart from one another with gaps Sb in the center-axis direction R of the post 111. Thus, the weight member 113B according to the second modification has the gaps Sb provided between the plurality of portions thereof.

Figure 6:
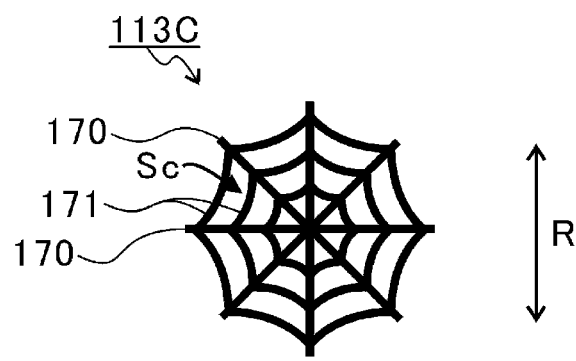
FIG. 6 illustrates a third modification of the weight member.

FIG. 6 illustrates a third modification of the weight member 113. As illustrated in FIG. 6, a weight member 113C according to the third modification has a shape of a spider's web. The weight member 113C according to the third modification includes a plurality of portions: for example, a plurality of linear members 170, and a plurality of arc members 171. The linear members 170 are arranged radially, and the arc members 171 each form an arc that connects adjacent ones of the linear members 170 to each other, whereby gaps Sc are provided between the plurality of linear members 170 and the plurality of arc members 171. Thus, the weight member 113C according to the third modification has the gaps Sc provided between the plurality of portions thereof.

Figure 7:
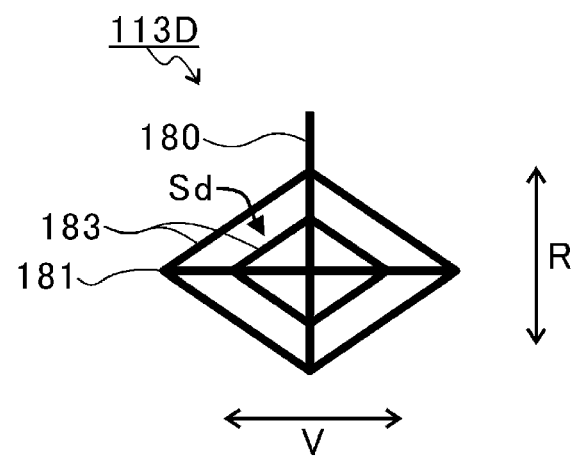
FIG. 7 illustrates a fourth modification of the weight member.

FIG. 7 illustrates a fourth modification of the weight member 113. As illustrated in FIG. 7, a weight member 113D according to the fourth modification has a diamond shape. The weight member 113D according to the fourth modification includes a plurality of portions: for example, a linear member 180, an orthogonal member 181, and a plurality of angled members 183. The linear member 180 extends in the center-axis direction R of the post 111. The orthogonal member 181 extends in an orthogonal direction V, which is orthogonal to the linear member 180. The angled members 183 are angled with respect to the center-axis direction R and to the orthogonal direction V. The plurality of angled members 183 are spaced apart from one another and each connect the linear member 180 and the orthogonal member 181 to each other, whereby gaps Sd are provided between the linear member 180, the orthogonal member 181, and the plurality of angled members 183. Thus, the weight member 113D according to the fourth modification has the gaps Sd provided between the plurality of portions thereof.

The weight members 113A, 113B, 113C, and 113D each have the gaps Sa, Sb, Sc, or Sd provided between the plurality of portions thereof. Therefore, ice is more likely to be formed on the weight members 113A, 113B, 113C, and 113D than on the weight member 113 according to the first embodiment. The high likelihood of icing increases the ease of increasing the weight of the exposed member 110. Consequently, the ease of detection of icing with the measuring device 130 is increased.

Second Embodiment

Figure 8:
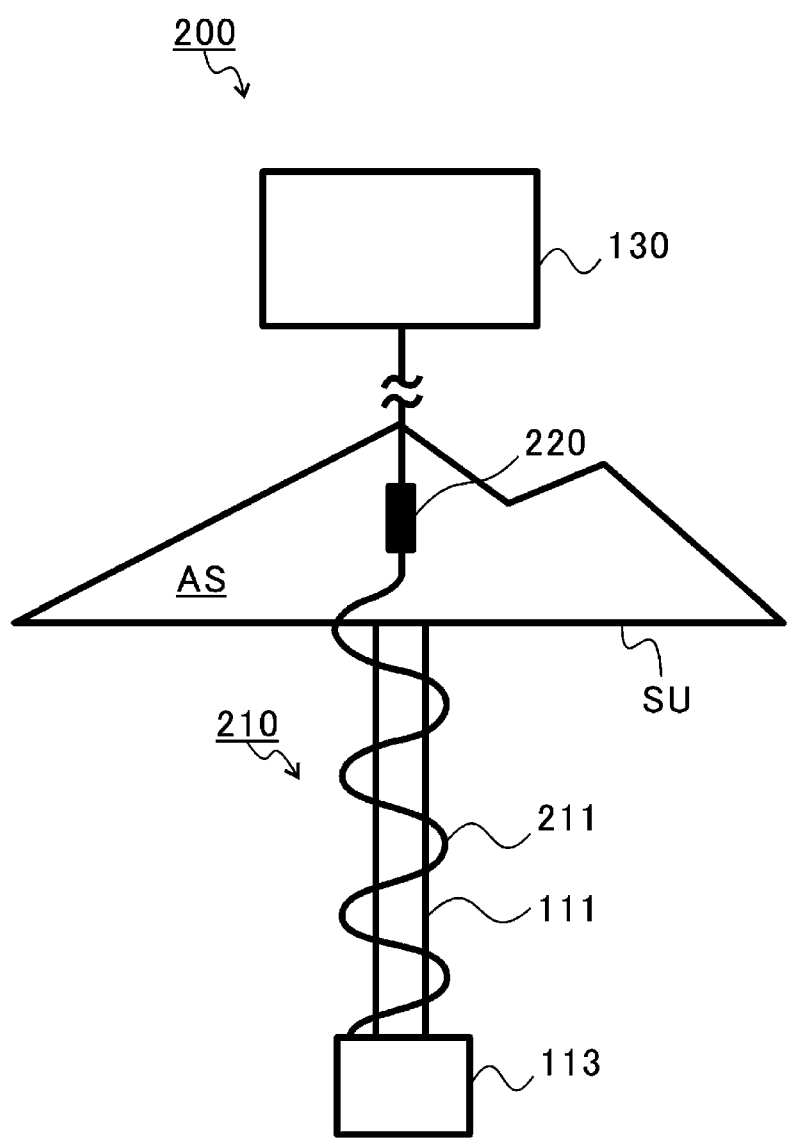
FIG. 8 schematically illustrates an icing detector according to an embodiment.

FIG. 8 schematically illustrates an icing detector 200 according to a second embodiment. Elements that are substantially equivalent to those of the icing detector 100 according to the first embodiment are denoted by corresponding ones of the reference signs used in the first embodiment, and description of those elements is omitted. The icing detector 200 includes an exposed member 210 and an optical fiber sensor 220. The exposed member 210 includes a flexible member 211. The optical fiber sensor 220 is coupled to the exposed member 210 (the flexible member 211).

The flexible member 211 is, for example, an optical fiber cable. One end of the flexible member 211 is coupled to the optical fiber sensor 220, and the other end of the flexible member 211 is coupled to the weight member 113. The flexible member 211 is wound around the post 111, with at least a portion thereof being spaced apart from the post 111. Accordingly, the flexible member 211 has some slack on the outside of the aircraft structure AS. Since the flexible member 211 has such slack, the optical fiber sensor 220 receives substantially no load from the flexible member 211.

The optical fiber sensor 220 is embedded in the aircraft structure AS and is positioned substantially in the center of the aircraft structure AS. The optical fiber sensor 220 is covered by the aircraft structure AS and is permanently fixed to the aircraft structure AS. The optical fiber sensor 220 is coupled to the measuring device 130.

While the optical fiber sensor 120 according to the first embodiment is covered by the exposed member 110, the optical fiber sensor 220 is covered by the aircraft structure AS, which is the difference between the two. The optical fiber sensors 120 and 220 may each be covered by both the exposed member 110 and the aircraft structure AS. That is, the optical fiber sensors 120 and 220 are each covered by at least one of the aircraft structure AS or the exposed member 110.

Figure 9:
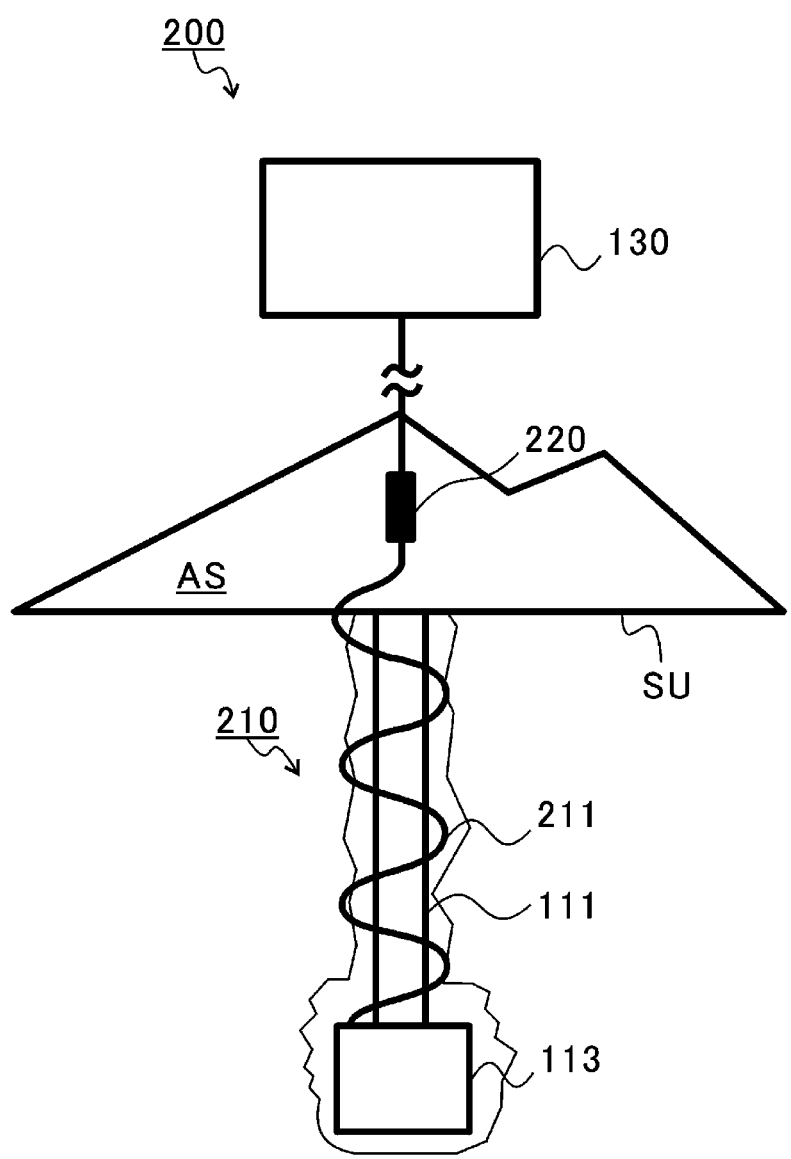
FIG. 9 schematically illustrates the icing detector according to the embodiment, with ice formed on an exposed member thereof.

FIG. 9 schematically illustrates the icing detector 200 according to the second embodiment, with ice formed on the exposed member 210. As illustrated in FIG. 9, if ice is formed on the exposed member 210, the flexible member 211 is fixed to the post 111 with the ice.

Therefore, if the post 111 and the weight member 113 vibrate while the aircraft 1 is flying, the flexible member 211 also vibrates, and the load of the vibration is transmitted to the optical fiber sensor 220. If such a load is transmitted to the optical fiber sensor 220, the optical fiber sensor 220 is strained or deformed, which changes the frequency of the backscatter to be measured by the measuring device 130. The measuring device 130 measures such a change in the frequency of the backscatter, thereby detecting the occurrence of icing on the exposed member 210.

To summarize, the optical fiber sensor 220 is covered by the aircraft structure AS. Therefore, the durability of the optical fiber sensor 220 is less likely to be deteriorated than in a case where the optical fiber sensor 220 is exposed to the outside of the aircraft structure AS.

Furthermore, since the flexible member 211 exposed to the outside of the aircraft structure AS is employed, the transmission of the vibration or load generated by icing on the exposed member 210 to the optical fiber sensor 220 is achieved in a good manner. The effects produced by the first embodiment are also produced.

While some embodiments of the disclosure have been described above with reference to the accompanying drawings, the disclosure is not limited thereto, needless to say. It is obvious that those skilled in the art can conceive various changes or modifications within the scope defined by the appended claims. It is of course understood that such changes or modifications are included in the technical scope of the disclosure.

The above embodiments each relate to a case where the exposed member 110 or 210 includes the weight member 113. However, the weight member 113 is an optional element and may be omitted from the exposed member 110 or 210.

According to each of the above embodiments of the disclosure, an icing detector that is less susceptible to electromagnetic interference is provided.

The invention claimed is:

1. An icing detector comprising:
an aircraft structure;
an exposed member comprising a post including a first end coupled to an outer surface of the aircraft structure and exposed to an outside of the aircraft structure, and an optical fiber cable wound around the post with at least a portion of the optical fiber cable being spaced apart from the post;
an optical fiber sensor covered by the aircraft structure, the optical fiber sensor being coupled to a second end of the optical fiber cable; and
a measuring device coupled to the optical fiber sensor, the measuring device being configured to emit light into the optical fiber sensor and measure a change in a frequency of backscatter of the light traveling through the optical fiber sensor, the change being due to the optical fiber sensor being strained and/or deformed by transmission of vibration and/or load to the optical fiber sensor when ice is formed on the exposed member.

2. The icing detector according to claim 1,
wherein the exposed member further comprises a weight member coupled to a third end opposite to the first end of the post.

3. The icing detector according to claim 2,
wherein the weight member includes at least one gap provided between a plurality of portions of the weight member.

4. The icing detector according to claim 3, wherein the weight member has a spiral shape, a conical shape, a shape of a spider's web, or a diamond shape.

5. The icing detector according to claim 2, wherein the exposed member further comprises a flexible member, and wherein one end of the flexible member is coupled to the optical fiber sensor, and the other end of the flexible member is coupled to the weight member.

6. The icing detector according to claim 5, wherein the flexible member is wound around the post.

7. The icing detector according to claim 1, wherein the optical fiber sensor is covered by the exposed member, extends through the aircraft structure, and is coupled to the measuring device that is provided inside the aircraft structure.

8. The icing detector according to claim 1, wherein a resonance frequency of the exposed member permanently fixed to the optical fiber sensor is tunable by changing a weight of the weight member.

9. The icing detector according to claim 1, wherein the optical fiber sensor is embedded in the post and extends through a center of the post.

10. The icing detector according to claim 1, wherein the optical fiber sensor extends in a longitudinal direction of the post.

11. The icing detector according to claim 1, wherein the optical fiber sensor covered by the exposed member is permanently fixed to the exposed member.

\* \* \* \* \*